US007952517B2

(12) United States Patent
Bury

(10) Patent No.: US 7,952,517 B2
(45) Date of Patent: May 31, 2011

(54) METHOD OF TRANSMITTING A SATELLITE POSITIONING SIGNAL FROM AN EXTERNAL ANTENNA TO AN UNEXPOSED RECEIVER, ESPECIALLY IN MECHANICAL VEHICLES

(75) Inventor: Henryk Bury, Mielec (PL)

(73) Assignee: BURY Sp. z o.o, Mielec (PL)

( * ) Notice: Subject to any disclaimer, the term of this patent is extended or adjusted under 35 U.S.C. 154(b) by 290 days.

(21) Appl. No.: 12/369,850

(22) Filed: Feb. 12, 2009

(65) Prior Publication Data

US 2009/0224968 A1 Sep. 10, 2009

(30) Foreign Application Priority Data

Mar. 4, 2008 (EP) .................................... 08460007

(51) Int. Cl.
*G01S 1/00* (2006.01)

(52) U.S. Cl. ........................................................ 342/350

(58) Field of Classification Search ............. 342/357.06, 342/357.01, 350
See application file for complete search history.

(56) References Cited

U.S. PATENT DOCUMENTS

| | | | | | |
|---|---|---|---|---|---|
| 1,893,605 | A | * | 1/1933 | Von Arco | 455/119 |
| 5,099,252 | A | * | 3/1992 | Bryant et al. | 343/713 |
| 5,155,494 | A | * | 10/1992 | Bryant et al. | 343/713 |
| 5,457,470 | A | * | 10/1995 | Hai et al. | 343/828 |
| 5,600,333 | A | * | 2/1997 | Justice et al. | 343/713 |
| 5,610,620 | A | * | 3/1997 | Stites et al. | 343/725 |
| 6,078,300 | A | * | 6/2000 | Militz et al. | 343/906 |
| 7,253,682 | B2 | * | 8/2007 | Raddant et al. | 330/143 |
| 7,439,909 | B2 | * | 10/2008 | Van Toorenburg | 342/357.25 |
| 7,511,681 | B2 | * | 3/2009 | Bolin | 343/876 |
| 2002/0008667 | A1 | * | 1/2002 | Nguyen et al. | 343/715 |
| 2002/0028655 | A1 | * | 3/2002 | Rosener et al. | 455/16 |
| 2008/0287064 | A1 | * | 11/2008 | Weiss | 455/41.2 |

* cited by examiner

*Primary Examiner* — Thomas H Tarcza
*Assistant Examiner* — Frank McGue
(74) *Attorney, Agent, or Firm* — Matthias Scholl P.C.; Matthias Scholl

(57) ABSTRACT

A device for transmitting a satellite positioning signal received by an external antenna to an unexposed receiver having an internal receiving antenna. A method of transmitting satellite positioning signal received by an external antenna to an unexposed receiver having an internal receiving antenna, comprising: (a) receiving satellite positioning signal from a satellite in an external antenna; (b) transforming the satellite positioning signal into an electric signal; (c) amplifying said electric signal into an amplified electric signal; (d) transferring said amplified electric signal by an electric cable to a transmitting antenna; (e) transforming said amplified electric signal in said transmitting antenna into an electromagnetic wave; (f) emitting said electromagnetic wave; and (g) receiving said electromagnetic waive by the internal receiving antenna of the unexposed received, wherein the internal receiving antenna of the unexposed received is shielded from directly receiving satellite positioning signal from satellites.

20 Claims, 3 Drawing Sheets

METHOD OF TRANSMITTING A SATELLITE POSITIONING SIGNAL FROM AN EXTERNAL ANTENNA TO AN UNEXPOSED RECEIVER, ESPECIALLY IN MECHANICAL VEHICLES

CROSS-REFERENCE TO RELATED APPLICATIONS

Pursuant to 35 U.S.C. §119 and the Paris Convention Treaty, this application claims the benefit of European Patent Application No. EP08460007 filed Mar. 4, 2008, the contents of which are incorporated herein by reference.

BACKGROUND OF THE INVENTION

1. Field of the Invention

This invention relates to a method of wireless transmission of satellite positioning signal from an external antenna to an unexposed receiver, especially in mechanical vehicles. This invention relates further to a device, which uses the method of wireless transmission of a satellite positioning signal from an external antenna to an unexposed receiver, especially in mechanical vehicles, the device being provided with an active external antenna, comprising: the main antenna, a high-frequency amplifier, a transmission cable, a transmitting antenna, and a navigation device receiver.

2. Description of the Related Art

Due to very low strength of satellite signals, especially in the GPS system, a high level of interference within antennas, and the lack of full visibility of the satellites, in order to receive stronger and less noisy signal, external antennas are used. Such antennas are provided with an electrical connection to a receiver in the navigation device. However, an important limitation of this solution is the need to use non-standardized connections between the cables and the receiver of the navigation device. Moreover, it is not possible or difficult to connect certain navigation devices to an external antenna.

U.S. Pat. No. 6,222,501 describes an external antenna of a GPS receiver, which is connected with a laptop-type portable computer by means of a cable and a plug and which enables navigation using the display of the computer. A limitation of this solution lies in that the cable connection to the external antenna and the location of the antenna is in a place where satellites are visible.

Japanese Pat. JP 2006 174 505 describes a stationary device retransmitting the telecommunication signal from satellites to an area, which is shielded, e.g. by a building. This device operates as follows: the satellite antenna is located in a position, at which satellites are visible, and it sends the signals received from the satellites to a transmitter by means of a cable, and the transmitter resends the signal to the area, where the satellites are not visible.

U.S. Pat. No. 5,600,333 discloses a device for retransmitting radio or GSM phone signal, which consists of an antenna mounted to the windshield of a car and provided with a transmitter and to the receiver of the radio signal, which is mounted to the windshield within the car and is located just below the transmitter and which forwards the signal to a radio set by means of a cable.

Also known are devices for retransmission of GSM signal, which consist of an antenna mounted on the roof of a car and provided with an electric cable connection with a transmitter that is located within the car, and which forward the received signals to the phone antenna by means of induction.

SUMMARY OF THE INVENTION

The object of this invention is to provide a method of transferring a satellite positioning signal from an external antenna, which is located in a place where the satellites are visible directly and the level of noise is lower, to a receiver; the satellite signal received is amplified in the amplifier and sent to a transmitting antenna, which then sends the signal wirelessly to an antenna in a navigation device located in the close vicinity to the transmitting antenna, especially within a mechanical vehicle.

This objective is achieved by a method of transmitting a satellite positioning signal from an external antenna to an unexposed receiver, especially in mechanical vehicle, wherein the satellite signal received by the external antenna and transformed into an electric signal, is subject to amplification and, then, is transferred, by means of a cable, to a transmitting antenna, which transforms this amplified electric signal into an electromagnetic wave and then emits this wave to a receiving antenna of the navigation device, the device being unexposed and shielded from satellite signals.

In one class of this embodiment, the transmitting antenna, provided with a cable connection to the external antenna, is particularly located in a close vicinity to the receiving antenna of the navigation device.

In another class of this embodiment, the amplification of the signal in the amplifier of the external antenna should be lower than the signal damping between the external main antenna and the antenna of the transmitter.

In another class of this embodiment, the amplification of the signal received by the external main antenna should be particularly higher than the damping of the transformed signal between the antenna of the transmitter and the antenna of the navigation device.

The object of this invention is also to provide a device, which is adapted to use in the method of transmission of the satellite signal according to the invention.

The device for transmitting a satellite positioning signal from an external antenna to an unexposed receiver, especially in mechanical vehicles, is characterized in that an amplifier of the active external antenna is connected, by means of a cable, with a transmitting antenna of the transmitter, whereas the navigation device is provided with a receiving antenna.

In a class of this embodiment, the transmitting antenna is particularly provided with a crystal.

In another class of this embodiment, the transmitting antenna is particularly a set of conductive paths.

In another class of this embodiment, the filters are particularly located between the amplifier and the antenna of the transmitter, to provide supply voltage to the amplifier via a cable.

In another class of this embodiment, the transmitter comprising the antenna and the antenna of the navigation device are particularly screened from external signals by means of a screen.

In another class of this embodiment, the antenna of the transmitter is particularly located in a close vicinity of the antenna of the navigation device.

The performance tests of the device for transmitting a satellite positioning signal from the external antenna to the unexposed receiver, especially in a mechanical vehicle, showed that the level of satellite signals received by the unexposed navigation device is significantly higher and characterized by lower noise level; the extra-amplified signal is transmitted wirelessly. The wireless transmission eliminates the need to use both the electrical cables and plugs and sockets used to provide connection between cables and the navigation device.

The device according to the invention may be also used when the navigation device is not provided with any connections and cannot receive any external signals.

BRIEF DESCRIPTION OF THE DRAWINGS

The device for transmitting satellite positioning signal from an external antenna to an unexposed receiver, especially in mechanical vehicles, according to the invention, is presented, by way of the example only, in the drawings, in which.

DETAILED DESCRIPTION OF THE EMBODIMENTS

Figure 1:
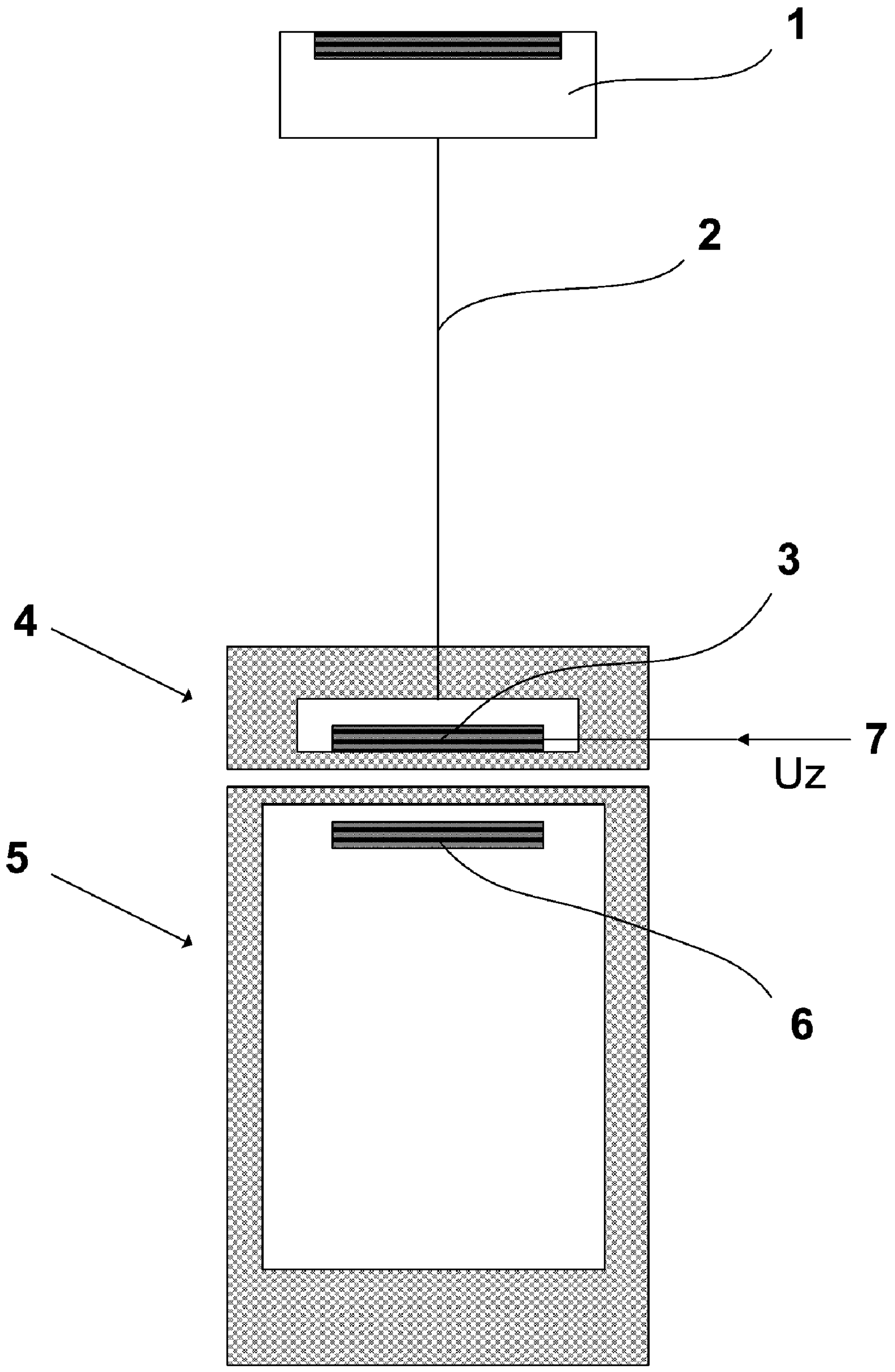
FIG. 1 is a diagram showing the principles of the operation of the device according to a representative embodiment of the invention.

Detailed description will be given below with reference to accompanying drawings.

A method of transmission of the satellite positioning signal from an external antenna to an unexposed receiver, especially in a mechanical vehicle, comprises receiving satellite signals by the external antenna, located particularly on the roof of the vehicle, transforming these signals in the antenna into electric signals, amplifying them in the amplifier, and sending them to a transmitting antenna by means of a cable. The transmitting antenna transforms the electric signal received from the cable into an electromagnetic wave of a frequency corresponding to that of the satellite signal. The electromagnetic waves emitted are received by the receiving antenna of the navigation device and transformed into signals, which correspond to the vehicle's position. These signals are then transformed within the navigation device using a known method.

An important feature of the method according to the invention, is that the transmitting antenna is placed in the vicinity of the receiving antenna of the satellite navigation device. On one hand, this results in lower damping of the signal, on the other hand, it limits noise affecting the value of the signal.

The device for transmitting a satellite positioning signal from an external antenna to an unexposed receiver, especially in mechanical vehicles, according to the invention, comprises the following components: an active external GPS antenna 1, an antenna cable 2 connecting the antenna 1 to the transmitting antenna 3 of the transmitter 4, which is located in the vicinity of the receiving antenna 6 of the navigation device 5.

The transmitter 4 is also provided with a low-voltage DC power supply 7.

The active external antenna 1 (FIG. 2) is connected to a cable 2 by means of a high-frequency amplifier 8 and the filter 9, separating the power supply 7. The transmitter 4, provided with the antenna 3, is connected with the cable 2 by means of the filter 10, introducing a constant component to the external antenna 1 through the cable 2. The transmitter 4 is also provided with a screen 11 preventing the entry of external signals to the transmitter 4 and the navigation device 5. However, this screen does not damp signals in the area between the transmitter 4 and the device 5.

Figure 3:
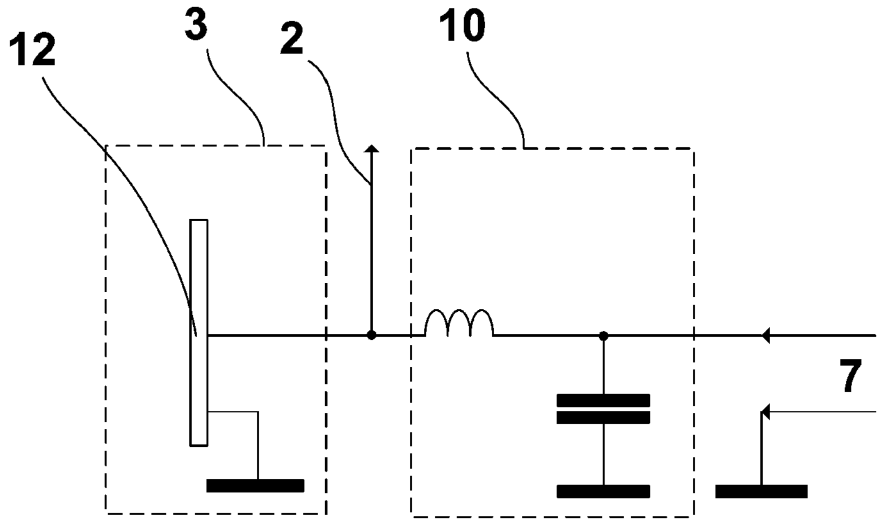
FIG. 3 is a schematic diagram of the receiving device according to a representative embodiment of the invention.

The schematic diagram of an example of the embodiment of the antenna 3 with the filter 10 is depicted on the FIG. 3. The antenna 3 consists of a crystal 12, which is fed by a high-frequency signal by means of the cable 2. The power supply 7 of the antenna 3 is provided to the cable 2 by means of the filter 10, composed of a reactor L and a capacitor C.

Figure 2:
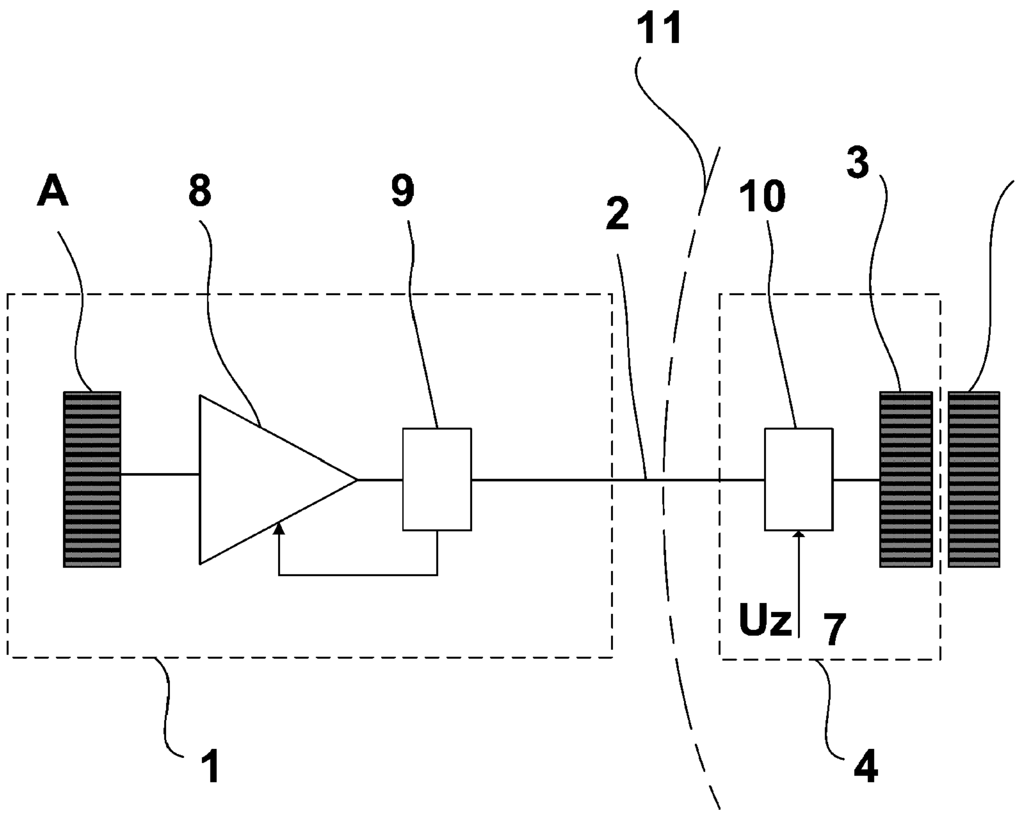
FIG. 2 is a block diagram of the device according to a representative embodiment of the invention.

The device for transmitting a satellite positioning signal from an external antenna to an unexposed receiver, as shown in the FIGS. 1 to 3, operates as follows. The satellite positioning signal, received by the crystal antenna A is transformed within the antenna into an electric signal, which is then amplified in the amplifier 8 powered by the filter 9 from the cable 2. The transformed and amplified high-frequency signal is transmitted by the filter 9 to the cable 2 linking the external antenna 1 with the transmitter 4. The signal transmitted by means of the cable 2 goes through the filter 10, in which the constant component is added to it by means of the power supply 7. Next, it reaches the transmitting antenna, which transforms the electric signal into an electromagnetic wave mapping the electromagnetic wave of the satellite signal. The signal emitted by the antenna 3 reaches the antenna of the navigation device 5, located in the vicinity of the antenna, and is transformed, by means of a known method, to its intended destination.

The embodiment of the device for transmitting a satellite positioning signal from an external antenna to an unexposed receiver, especially in mechanical vehicles, as described above by means of an example, is not limited to the idea of the invention since any single component of the device may be modified to meet the particular needs.

Figure 4:
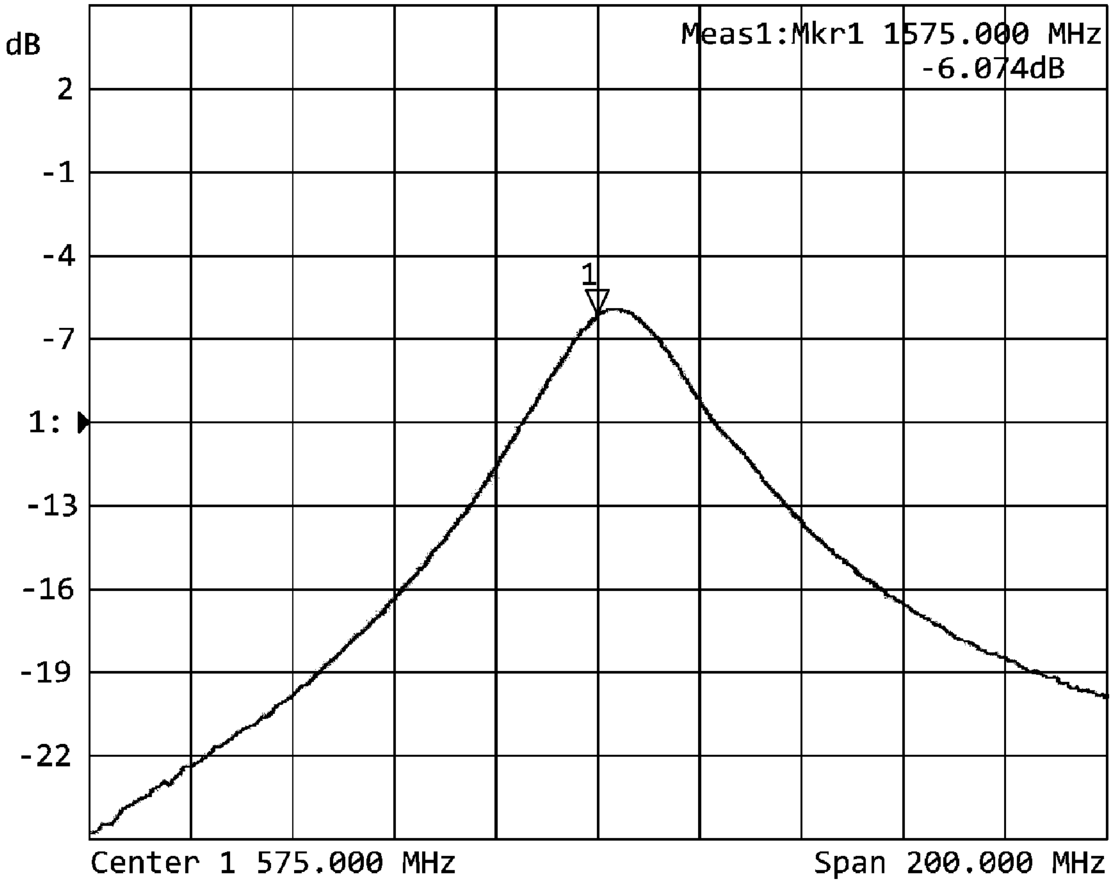
FIG. 4 shows the results of the tests run to determine the dependence of damping the satellite signal received by the receiver on the frequency of the signal.

The chart shown in the FIG. 4 illustrated results of damping of the satellite signal received in the navigation device by the device according to the invention.

The curve shown in FIG. 4, illustrated clearly a maximum corresponding to the lowest absolute value of signal damping between the antenna 3 and the antenna of the navigation device 5. The damping is about 6 dB at the frequency of 1575 MHz, which is the frequency of the satellite signal transmitted. As a result of the amplification of the satellite signal, at such low damping level, the signal transmitted to the navigation device 5 is many times stronger than the signal received by the external antenna 1. The screen 11 is provided to minimize any other noise signals reaching the antenna 6 in the navigation device.

In order to eliminate the possibility of induction of high-frequency electromagnetic oscillation in the external antenna 1, the signal damping between the antenna 3 of the transmitter 4 and the main antenna A of the external antenna 1 should be higher than the amplification of the amplifier 8 of the signal received by the external antenna 1.

In order to ensure a proper transmission of the signal by the device, the amplification of the amplifier 8 of the signals received by the external antenna 1 should be higher than dumping between the antenna 3 of the transmitter 4 and the antenna 6 of the navigation device 5.

This invention is not to be limited to the specific embodiments disclosed herein and modifications for various applications and other embodiments are intended to be included within the scope of the appended claims. While this invention has been described in connection with particular examples thereof, the true scope of the invention is not so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A method of transmitting satellite positioning signal received by an external antenna to an unexposed receiver having an internal receiving antenna, comprising:

(a) receiving satellite positioning signal from a satellite in an external antenna;

(b) transforming the satellite positioning signal into an electric signal;

(c) amplifying said electric signal into an amplified electric signal;

(d) transferring said amplified electric signal by an electric cable to a transmitting antenna;

(e) transforming said amplified electric signal in said transmitting antenna into an electromagnetic wave;

(f) emitting said electromagnetic wave; and (g) receiving said electromagnetic wave by the internal receiving antenna of the unexposed received, wherein the internal receiving antenna of the unexposed received is shielded from directly receiving satellite positioning signal from satellites, and wherein amplification in an amplifier of the external antenna is lower than signal damping between the external antenna and the transmitting antenna.

2. The method of claim 1, wherein said external antenna and said unexposed receiver are disposed in a mechanical vehicle.

3. The method of claim 1, wherein said transmitting antenna is connected by an electric cable to said external antenna, and said transmitting antenna is located in close proximity to the internal receiving antenna of the unexposed receiver.

4. The method of claim 1, wherein amplification of signal received by the external antenna is higher than signal damping between the transmitting antenna and the internal receiving antenna.

5. A method of transmitting satellite positioning signal received by an external antenna to an unexposed receiver having an internal receiving antenna, comprising:

(a) receiving satellite positioning signal from a satellite in an external antenna;

(b) transforming the satellite positioning signal into an electric signal;

(c) amplifying said electric signal into an amplified electric signal;

(d) transferring said amplified electric signal by an electric cable to a transmitting antenna;

(e) transforming said amplified electric signal in said transmitting antenna into an electromagnetic wave;

(f) emitting said electromagnetic wave; and (g) receiving said electromagnetic wave by the internal receiving antenna of the unexposed received, wherein the internal receiving antenna of the unexposed received is shielded from directly receiving satellite positioning signal from satellites, and wherein amplification of signal received by the external antenna is higher than signal damping between the transmitting antenna and the internal receiving antenna.

6. The method of claim 5, wherein said external antenna and said unexposed receiver are disposed in a mechanical vehicle.

7. The method of claim 5, wherein said transmitting antenna is connected by an electric cable to said external antenna, and said transmitting antenna is located in close proximity to the internal receiving antenna of the unexposed receiver.

8. A device for transmitting satellite positioning signal received by an external antenna to an unexposed receiver, the device comprising:

a main antenna (A), a high-frequency amplifier (8);

a transmitter (4) having a transmitting antenna (3); and a navigation device (5) having an internal receiving antenna (6);

wherein the amplifier (8) is connected by means of an electric cable (2) with the transmitting antenna (3) of the transmitter (4), and wherein an amplification in an amplifier of the external antenna is lower than signal damping between the external antenna and the transmitting antenna (3).

9. The device of claim 8 disposed in a mechanical vehicle.

10. The device of claim 8, wherein the transmitting antenna (3) is provided with a crystal.

11. The device of claim 8, wherein the transmitting antenna (3) is a set of conductive paths.

12. The device of claim 8, wherein two filters (9 and 10) are disposed between the amplifier (8) and the transmitting antenna (3), whereby feeding supply voltage (7) to the amplifier (8) via said cable (2).

13. The device of claim 8, wherein the transmitter (4) and the internal receiving antenna (6) are shielded from external noise signals by means of a screen (11).

14. The device of claim 8, wherein the transmitting antenna (3) is located in a close proximity of the internal receiving antenna (6).

15. The device of claim 8, wherein an amplification of signal received by the external antenna is higher than signal damping between the transmitting antenna (3) and the internal receiving antenna (6).

16. A device for transmitting satellite positioning signal received by an external antenna to an unexposed receiver, the device comprising:

a main antenna (A), a high-frequency amplifier (8);

a transmitter (4) having a transmitting antenna (3); and a navigation device (5) having an internal receiving antenna (6);

wherein the amplifier (8) is connected by means of an electric cable (2) with the transmitting antenna (3) of the transmitter (4), and wherein an amplification of signal received by the external antenna is higher than signal damping between the transmitting antenna (3) and the internal receiving antenna (6).

17. The device of claim 16 disposed in a mechanical vehicle.

18. The device of claim 16, wherein the transmitter (4) and the internal receiving antenna (6) are shielded from external noise signals by means of a screen (11).

19. The device of claim 16, wherein the transmitting antenna (3) is located in a close proximity of the internal receiving antenna (6).

20. The device of claim 16, wherein two filters (9 and 10) are disposed between the amplifier (8) and the transmitting antenna (3), whereby feeding supply voltage (7) to the amplifier (8) via said electric cable (2).

* * * * *